Nov. 26, 1963    L. PÉRAS    3,111,884
ROTORS OF ROTARY ENGINES

Filed March 15, 1962    2 Sheets-Sheet 1

Inventor
Lucien Peras
By Stevens Davis Miller & Mosher
Attorneys

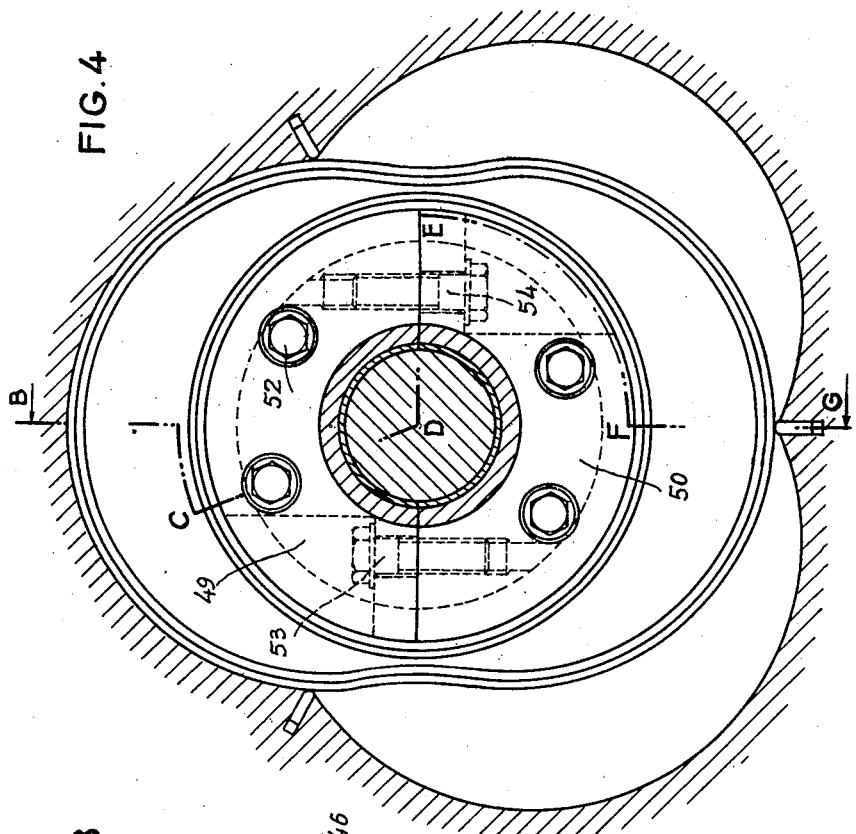
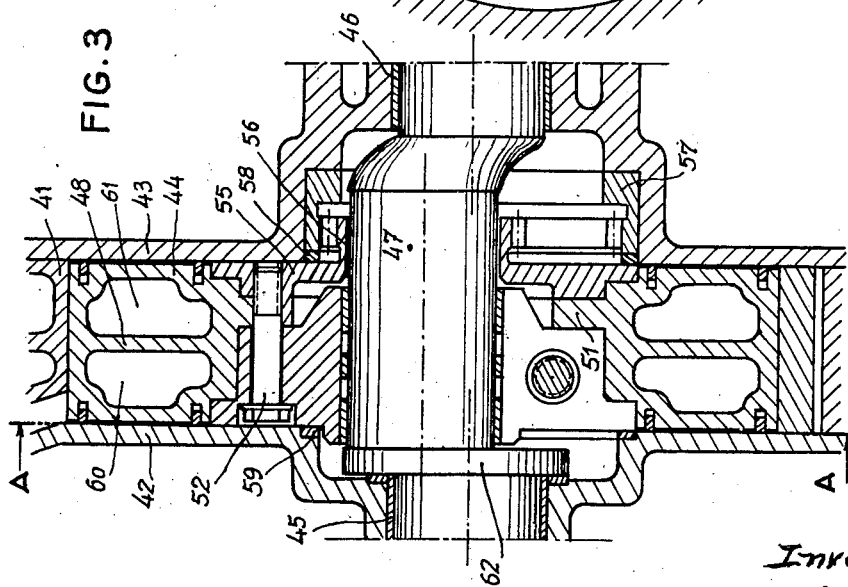

United States Patent Office 3,111,884
Patented Nov. 26, 1963

3,111,884
ROTORS OF ROTARY ENGINES
Lucien Péras, Billancourt, France, assignor to Regie Nationale des Usines Renault, Billancourt, France, French works
Filed Mar. 15, 1962, Ser. No. 179,930
Claims priority, application France Mar. 25, 1961
4 Claims. (Cl. 91—56)

It is known to construct rotors of rotary engines by casting or forging an integral, unitary piece formed internally with a cylindrical bore revolving on the essentric section of a crankshaft and externally with an epicyclic contour.

A major drawback encountered in a rotor construction of this unitary or one-piece type is that it requires an essentric of considerable diameter, at least equal to $(2R+e)$ wherein R is the radius of the crankshaft bearing and $e$ the eccentricity of the crankshaft, in order to permit the insertion of the crank shaft into the rotor bore, the inner diameter of the rotor proper, which is journaled on this eccentric, having the same order of magnitude. However, as the rotor and crankshaft revolve in opposite directions, in engine of this type, the relative velocity of the rotor and crankshaft becomes rapidly prohibitive when high-speed engines are contemplated.

It is the object of this invention to provide a rotor made of several sections whereby the diameter of the eccentric of a one-piece crankshaft can be reduced to convenient values, the rotor being easily mounted on this eccentric of smaller diameter.

In order to afford a clearer understanding of this invention and of the manner in which the same may be carried out in practice, reference will now be made to the accompanying drawings in which:

FIGURE 3 is a longitudinal section taken upon the broken line A', B', C', D' of FIG. 4, in the case of an alternate embodiment of the rotary engine, and FIGURE 4 is an end view and fragmentary cross-section of the rotor of FIG. 3, as seen in the direction of the arrows A—A of this figure.

Figure 1:
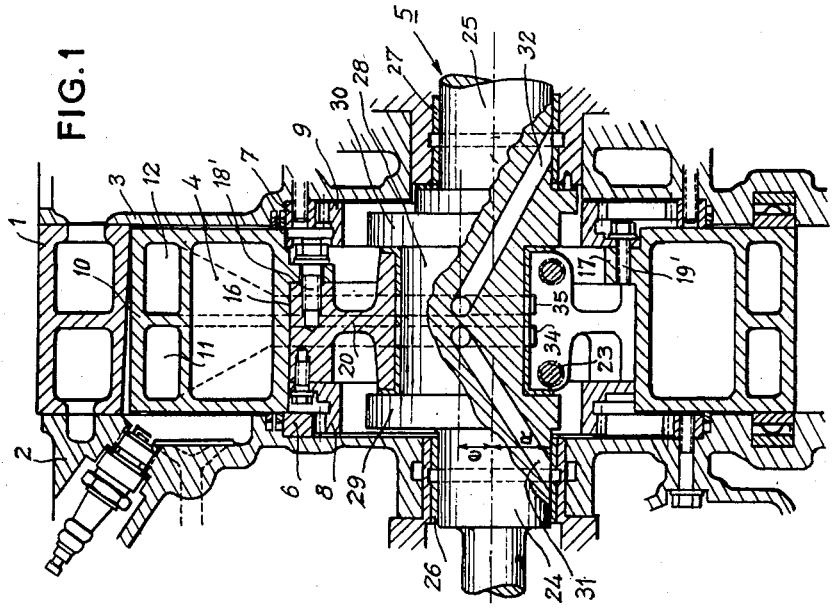
FIGURE 1 is a longitudinal section taken upon the broken line A, B, C, D of FIG. 2, showing a rotary engine constructed according to the teachings of this invention.
Figure 2:
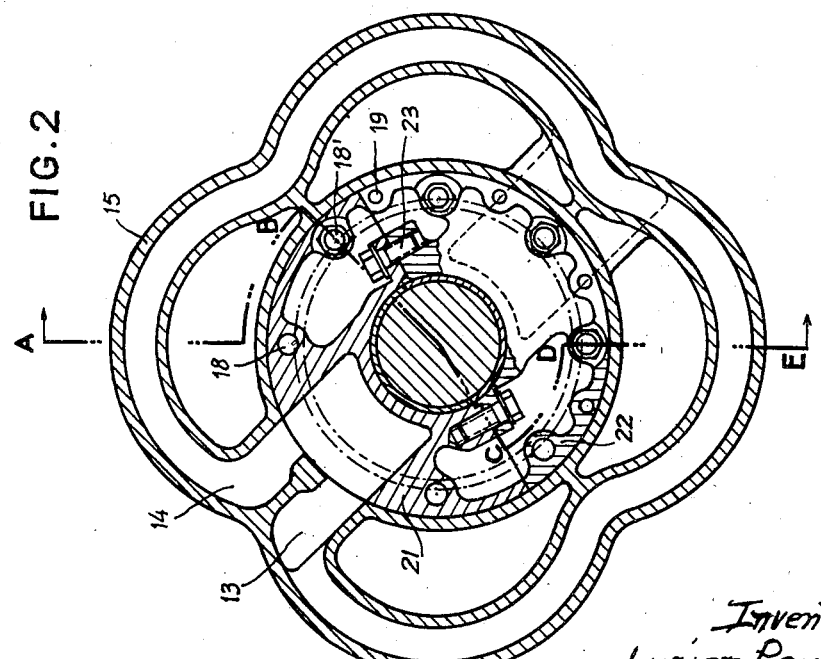
FIGURE 2 is a cross-sectional view showing the rotor of the engine illustrated in FIG. 1.

In the embodiment illustrated in FIGS. 1 and 2 the engine comprises a stator 1, having end flanges 2, 3, a rotor 4 to be described in detail presently, toothed guide rings 6, 7 rigid with the stator, and gear wheels 8, 9 rigid with the rotor.

The rotor 4 comprises a ring 10 formed as a rule with inner cooling means consisting of peripheral ducts 11, 12 and radial ducts 13, 14.

This ring 10 is formed with an outer contour 15 of epicyclic configuration, and with an inner cyclindrical bore 6 having an inner circular flange 17 formed with bolt holes 18, 19. This flange may be hollowed out to reduce its weight between the fixation bolts. A hub 20 consisting of two halves 21, 22 and assembled in a joint plane coincident with the axis of the eccentric is formed with cavities and lugs for receiving assembly screws 23, this hub revolving freely on the crankshaft.

The one-piece crankshaft proper comprises two stator bearing journals 26, 27 and an eccentric 28 of reduced diameter, as well as two flanges 29, 30.

The engine is cooled according to the arrangement described and illustrated in application Serial No. 162,540, filed December 27, 1961, by circulating oils through inlet and outlet orifices 31, 32 communicating with the circular grooves 34 and 35 in the hub 20, this oil being delivered to the peripheral ducts 11 and 12 through the radial ducts 13, 14. Concerning the oil circulation, there is no communication between the conduits 11 and 12, each of which is in communication with an inlet and outlet. FIGURE 1 shows the inlet 31 for the conduit 11 and the outlet 32 for the conduit 12, the outlet for the conduit 11 and the inlet for the conduit 12 being located in a different plane.

The assembly can be accomplished without difficulty by fitting the two hub halves 21, 22 on the crankshaft and tightening the bolts 23.

The rotor ring 10 is then positioned and secured on the hub by means of bolts 18'. Other bolts 19' secure the gear wheels 8, 9 on the hub.

The alternate embodiment illustrated in FIGS. 3 and 4 refers to a two-lobe rotor revolving eccentrically in a three-lobe stator.

This assembly comprises a fixed stator 41 and stator flanges 42, 43 receiving in their bearings 45, 46 the one-piece crankshaft 47 formed with only one flange 62 on one side.

The rotor 44 comprises a ring 48 assembled on a hub made of two halves or sections 49 and 50.

The rotor ring 48 is formed with an inner circular rib 51 to permit the mounting on the two hub sections 49 and 50 by means of bolts 52, the two hub sections being assembled in turn with each other by means of bolts 53 and 54. Moreover, the bolts are screwed in the toothed driving gear 55 of the rotor, of which the inner bore 56 is large enough to accommodate the crankshaft and permit the fitting of this part from the side opposite to the flange 62, without necessitating the use of a split or two-part crankshaft. The fixed gear 57 solid with the stator is secured on the flange 43 by means of bolts (not shown) and a "floating" friction washer 58 is interposed between the two guide gears 55 and 57 to provide the side play necessary for the proper relative movement of the rotor 44 and flange 43. Another friction washer 59 of the non-floating type is fitted in the flange 42 to act on the side faces of the two hub halves 49 and 50 and thus provide the side play necessary for the proper operation between the rotor 48 and flange 42.

The rotor cooling system is not shown but may be of the type described and illustrated in the patent referred to hereinabove in connection with the first embodiment, this system causing oil to circulate in the rotor and in cavities 60 and 61, the oil being delivered through the crankshaft 47.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:
1. Improvements in rotary engines comprising in a stator a rotor carried by a crankshaft and formed with an epicyclic outer contour, characterized in that said rotor consists of a separate ring and hub assembly, said hub consisting in turn of a plurality of sections assembled by bolting or otherwise.
2. Rotary engine rotor according to claim 1, characterized in that said rotor ring comprises on one side a circular inner flange whereby said ring is attached to said hub by bolting or otherwise.
3. Rotary engine rotor according to claim 2, characterized in that the circular inner flange of the rotor carries a toothed ring for guiding the rotor.
4. Rotor according to claim 3, charaacterized in that said guide gear of the rotor and the rotor ring are assembled by the same bolts on the hub.

No references cited.